April 19, 1927.

C. F. BERTHELSEN

LIGHT PROJECTOR

Filed Dec. 2, 1926

1,625,763

C. F. Berthelsen, inventor

By: Marks & Clark, Attys.

Patented Apr. 19, 1927.

1,625,763

UNITED STATES PATENT OFFICE.

CARL FREDERIK BERTHELSEN, OF FREDERIKSBERG, NEAR COPENHAGEN, DENMARK.

LIGHT PROJECTOR.

Application filed December 2, 1926, Serial No. 152,257, and in Denmark July 28, 1925.

This invention relates to an improvement in signalling apparatus, lamps or lanterns and projectors of light and the like, by which it becomes possible to send practically all the rays of light emenating from the source of light out in the same direction. The object is to make the small quantity of light sent out from a very small and accordingly cheap source of light visible over a considerable distance.

According to the present invention this is obtained by providing, in addition to the usual parabolic reflecting mirror behind the source of light, which serves to give the rays from the rear side of the source of light a direction forward, a plano-convex lens of very short focal length immediately in front of the source of light, and in addition thereto an annular ring with a flat or only slightly curved surface surrounding the said plano-convex lens.

A preferred form of projector according to the present invention is illustrated in the accompanying drawing in which.

Figure 1:
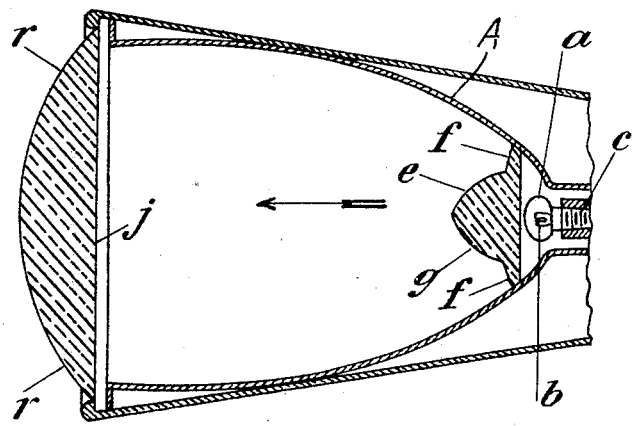
Fig. 1 is a longitudinal sectional view of the projector.
Figure 2:
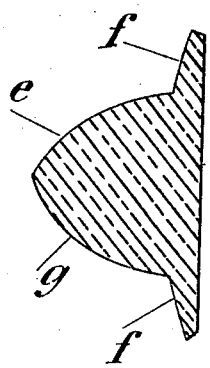
Fig. 2 is a sectional view of the lens adjacent the source of light.

Referring to the drawings, the source of light $a$, which may suitably be an electric lamp with an incandescent body $b$, is screwed into a lamp-holder $c$ disposed within a parabolic reflecting mirror A whose focus coincides with the incandescent body $b$. The rays issued from the incandescent body $b$ in a lateral direction towards the reflecting mirror will be reflected as parallel rays by this mirror and sent out in the direction of projection, as indicated by the arrow in Figure 1.

Immediately in front of the source of light a lens $e$ is provided, having a central convex portion $g$, the focal length of which is relatively small, and an annular portion $f$ surrounding the convex portion $g$. This annular portion has a slightly inclined front face, while the rear face of the lens formed by the portions $f$ and $g$ is flat. By positioning the lens $e$ in close proximity to the source of light a substantial portion of the light issuing forwardly from the lamp $a$ is intercepted by the central convex portion $g$, this central portion being sharply curved so that it has a very short focal distance. The position of the said lens with relation to the filament is so positioned that the said lens causes the largest portion of forwardly directed rays to converge in such a manner and to such an extent that they meet a front lens $j$, the focal length of which is relatively large and the latter lens is so positioned that the rays will be thrown out as a strongly concentrated beam of parallel rays of light in the direction of the axis of the lens.

Another portion of the rays issued by the filament $b$ is intercepted by the annular edge or margin $f$ of the lens $e$, either directly or indirectly after being reflected from the back portion of the reflector A. After having passed through the said annular edge $f$ some of these rays meet the walls of the reflector A, from which they are reflected towards the front lens in such a manner that the front lens will cause them to be thrown out in a beam at a relatively large angle to the axis of the lens. This latter beam of light which surrounds the central beam gives rise to the weaker illumination of the area surrounding the strongly illuminated central area.

The construction of a projector in accordance with the present invention may of course depart from that described and set forth, and illustrated in the drawing in the matter of a number of details, without thereby departing from the principle of the invention.

I claim.

In a light projector, the combination of a source of light, a lens disposed in front of and in close proximity to said source of light, said lens comprising a central convex portion having a short focal length and an annular portion surrounding said central portion, said annular portion having a front face slightly inclined to the circumferential edge of the lens, the rear face of said lens being flat, and a second plano-convex lens having a radius of relatively great length disposed in front of and in axial alignment with said first lens, said second lens being positioned with respect to said first lens to converge the light from said source to form a beam of parallel rays.

In testimony whereof, I affix my signature.

CARL FREDERIK BERTHELSEN.